(12) United States Patent
Kim et al.

(10) Patent No.: US 7,600,840 B2
(45) Date of Patent: Oct. 13, 2009

(54) DEVICE FOR PRINTING DROPLET OR INK ON SUBSTRATE OR PAPER

(75) Inventors: Su-hyeon Kim, Seoul (KR); Jeong-gun Lee, Seoul (KR); Jong-suk Chung, Suwon-si (KR); Hye-jung Cho, Anyang-si (KR); Nam Huh, Seoul (KR); In-seok Kang, Pohang-si (KR); Beom-seok Lee, Pohang-si (KR)

(73) Assignee: Samsung Electronics Co., Ltd. (KR)

( * ) Notice: Subject to any disclaimer, the term of this patent is extended or adjusted under 35 U.S.C. 154(b) by 325 days.

(21) Appl. No.: 11/503,786

(22) Filed: Aug. 14, 2006

(65) Prior Publication Data

US 2007/0035567 A1 Feb. 15, 2007

(30) Foreign Application Priority Data

Aug. 12, 2005 (KR) ........................ 10-2005-0074496
Apr. 7, 2006 (KR) ........................ 10-2006-0031930

(51) Int. Cl.
*B41J 29/38* (2006.01)

(52) U.S. Cl. ........................ 347/14; 347/20; 347/47

(58) Field of Classification Search ........................ 347/7, 347/10, 14, 47, 719, 20
See application file for complete search history.

(56) References Cited

U.S. PATENT DOCUMENTS 5,927,547 A * 7/1999 Papen et al. .................... 222/57

6,513,894 B1 2/2003 Chen et al.

FOREIGN PATENT DOCUMENTS

| EP | 1208912 A2 | 5/2002 |
| EP | 1445016 A1 | 8/2004 |
| WO | WO9744134 | 11/1997 |
| WO | WO03022438 | 3/2003 |

OTHER PUBLICATIONS

European Search Report; EP06254255; Nov. 24, 2006.
On-Demand Droplet Spotter for Preparing Pico- to Femtoliter Droplets on Surfaces; Osamu Yogi, Tomonori Kawakami, Masayo Yamauchi, Jing Yong Ye, Mitsuru Ishikawa; Anal. Chem. 2001, 73, 1896—1902.
All the references cited in the Search Report are listed above.

* cited by examiner

*Primary Examiner*—Thinh H Nguyen
(74) *Attorney, Agent, or Firm*—Cantor Colburn LLP

(57) ABSTRACT

A device for printing a droplet onto a substrate includes: a droplet generating member which is needle-shaped and comprises a receiving portion disposed vertically to receive a solution, and a discharge hole connected to the receiving portion and formed on a bottom of the receiving portion so that the solution can be discharged from the receiving portion; a substrate disposed below the droplet generating member, the substrate includes a target portion to which the droplet discharged from the discharge hole of the droplet generating member is dropped and attached; a voltage applier applying a voltage to the droplet so that the droplet can be dropped onto the target portion of the substrate; a volume measuring unit measuring the volume of the droplet; and a droplet control unit maintaining the volume of the droplet at a predetermined level based on the measured volume of the droplet.

9 Claims, 9 Drawing Sheets

DEVICE FOR PRINTING DROPLET OR INK ON SUBSTRATE OR PAPER

This application claims priority to Korean Patent Application Nos. 10-2006-0031930, filed on Apr. 7, 2006, and 10-2005-0074496, filed Aug. 12, 2005, and all the benefits accruing therefrom under 35 U.S.C. §119, the contents of which in their entirety are herein incorporated by reference.

BACKGROUND OF THE INVENTION

1. Field of the Invention

The present invention relates to a device for printing a droplet on a substrate or ink on a sheet of paper, and more particularly, to a device for printing a droplet including bioparticles such as nucleic acids (e.g., probe DNA, RNA, PNA and LNA), proteins (e.g., antigen and antibody), oligopeptides, eukaryotic cells (e.g., human cells, animal cells and vegetable cells), viruses and bacteria on a substrate using an electric charge concentration effect and fixing the droplet to the substrate to manufacture a biochip, and a device for printing ink on a sheet of paper using an electric charge concentration effect by dropping ink onto the sheet of paper to print contents of computer document files or photographic files.

2. Description of the Related Art

As a result of the epoch-making development of the Human Genome Project, there is an increasing need for methods of rapidly providing a large amount of genetic information for the diagnosis, treatment and prevention of genetic disorders. Although the Sanger method for analyzing nucleotide sequences has been constantly developed through the development and automation of a polymerase chain reaction ("PCR") method, in which DNAs are duplicated, complex and extensive time, labor, expense and expertise are required to perform the Sanger method. Thus, a large number of genes cannot be analyzed using the Sanger method. As a result, new systems for analyzing nucleotide sequences are continuously being researched. In the last several years, there have been advances in many fields relating to the manufacture and application of biochips.

A biochip, that is, a biological microchip, includes a solid substrate which is made of, for example, silicon, surface-modified glass, polypropylene, or activated polyacrylamide and combined with biomolecules such as nucleic acids, proteins and cells. Biochips can be used to analyze gene developing patterns, genetic defects, protein distribution, or various kinds of reaction patterns.

If a target material to be analyzed is applied to the biochip, the target material hybridizes with probes immobilized on the biochip. The hybridization is optically or radiochemically detected and analyzed to identify the target material. For example, if a fragment of target DNA to be analyzed is applied to the DNA chip (or DNA microarray) having probes, the target DNA complementarily hybridizes with the probes immobilized on the biochip. The hybridization is detected and analyzed using various detecting methods to identify the nucleotide sequence of the target DNA, which is called sequencing by hybridization ("SBH").

A printing device used to manufacture a biochip or DNA microarray includes a droplet generating member disposed above a substrate in order to drop droplets on the substrate. The volume of the droplet is reduced as time elapses when the droplet protruding downward from the droplet generating member. The droplet evaporates in proportion to the surface area of the droplet,. When the volume of the droplet is reduced, a spot size of the droplet to be printed on the substrate is reduced. However, the conventional printing device does not include a member for maintaining the size of the droplet in order to ensure a constant spot size. Thus, a desired spot size cannot be obtained using the conventional printing device.

When a biochip or DNA microarray is manufactured, a fine droplet is dropped onto the substrate to form the spot, and thus, small variations in the size of the volume of the droplet have a large effect on the size of the spot formed on the substrate. Therefore, the size of the volume of the droplet formed on the lower portion of the droplet generating member should be maintained constant in order to manufacture a microarray including spots of uniform size. If the size of the volume of the droplet formed on the lower portion of the droplet generating member is not maintained to be constant, the size of the spots formed on the substrate cannot be maintained uniformly. Thus, excellent performance of the DNA microarray, that is, the precise analysis of a DNA sequence, cannot be obtained.

BRIEF SUMMARY OF THE INVENTION

The present invention provides a device for printing a droplet on a substrate using an electric charge concentration effect such that the volume of the droplet protruding from a discharge hole can be maintained constant.

The present invention also provides a method of printing a droplet including bioparticles or ink onto a substrate to have uniform spot sizes using an electric charge concentration effect.

According to an exemplary embodiment of the present invention, there is provided a device for printing a droplet onto a substrate, the device including: an electric field generating electrode which is needle-shaped and comprises: a receiving portion disposed vertically to receive a solution; and a discharge-hole connected to the receiving portion and formed on the bottom of the receiving portion so that the solution can be discharged from the receiving portion; a substrate disposed below the droplet generating member, the substrate includes a target portion to which the droplet discharged from the discharge hole of the droplet generating member is dropped and attached; a voltage applier applying a voltage to the droplet so that the droplet can be dropped onto the target portion of the substrate; a volume measuring unit measuring the volume of the droplet; and a droplet control unit maintaining the volume of the droplet at a predetermined level based on the measured volume of the droplet.

The droplet may be dropped onto a substrate using an electric charge concentration effect.

The electric field generating electrode which is needle-shaped may include: a receiving portion disposed vertically o receive a solution; and a discharge hole connected to the receiving portion and formed on a bottom of the receiving portion so that the solution can be discharged from the receiving portion.

The voltage applier may be an open circuit type voltage applier electrically connected to the electric field generating electrode and supplies electric charges to the electric field generating electrode so that the droplet drops onto the target portion of the substrate due to a Coulomb force generated between the charges of the electric field generating electrode and charges induced in the substrate.

The volume measuring unit may include: a light source emitting light onto the droplet; an image sensor sensing an image of the droplet that is generated by the light emitted from the light source; and a computer processor receiving data sensed by the image sensor and calculating the volume of the droplet.

The device may further include a divergent lens disposed between the light source and the image sensor.

The image sensor may sense a one-dimensional image of the droplet or a two-dimensional image of the droplet.

The light source may be disposed perpendicularly to a longitudinal direction of the electric field generating electrode.

The droplet control unit may include a pump for compressing or decompressing the solution in the receiving portion.

The pump may be a syringe pump.

The substrate may be electrically non-conductive and is not grounded, and an air layer is disposed below the substrate so as not to affect the electric field generated by the open circuit type voltage applier.

The solution may include bioparticles, and the bioparticles may be selected from the group consisting of nucleic acids, proteins, oligopeptides, eukaryotic cells, viruses and bacteria.

The open circuit type voltage applier may apply a voltage pulse so that an electric field is intermittently formed between the electric field generating electrode and the substrate.

The voltage pulse may have an amplitude ranging from about 100 V to about 100,000 V.

A pulse width of the voltage pulse may range from about 10 μs to about 100 ms.

The voltage pulse may be trapezoidal.

The substrate may be formed of glass or a polymer, that is, an electric insulator, or formed of two or more among silicon, glass and a polymer.

The surface of the substrate, the target portion in particular, may be coated with at least one of an amine group, a carboxyl group, streptavidine, biotin, thiol and poly-L-Lysine.

According to another exemplary embodiment of the present invention, there is provided a method of printing a droplet on a substrate using an electric charge concentration effect, the method including: disposing an electric field generating electrode in a longitudinal direction to receive a solution, the electric field generating electrode which is needle-shaped includes a receiving portion formed of a conductive material and receives a solution including bioparticles selected from the group consisting of nucleic acids (e.g., probe DNA, RNA, PNA and LNA), proteins (e.g., antigen and antibody), oligopeptides, eukaryotic cells (e.g., human cells, animal cells and vegetable cells), viruses, bacteria and ink, and a discharge hole connected to the receiving portion and formed on a bottom of the receiving portion so that the solution can be discharged out of the receiving portion; disposing a substrate below the electric field generating electrode, the substrate including a target portion onto which the droplet discharged from the discharge hole of the electric field generating electrode is dropped and attached; electrically connecting an open circuit type voltage applier to the electric field generating electrode; supplying the solution to the receiving portion of the electric field generating electrode; measuring the volume of the droplet; maintaining the volume of the droplet at a predetermined level based on the measured volume of the droplet; and applying a voltage to the electric field generating electrode from the open circuit type voltage applier to supply electric charges to the electric field generating electrode, and dropping the droplet onto the target portion of the substrate through a Coulomb force generated between the charges in the electric field generating electrode and charges induced in the substrate.

BRIEF DESCRIPTION OF THE DRAWINGS

The above and other aspects, features and advantages of the present invention will become more apparent by describing exemplary embodiments thereof with reference to the attached drawings in which.

DETAILED DESCRIPTION OF THE INVENTION

Hereinafter, the present invention will be described more fully with reference to the accompanying drawings, in which exemplary embodiments of the invention are shown.

It will be understood that when an element is referred to as being "on" another element, it can be directly on the other element or intervening elements may be present therebetween. In contrast, when an element is referred to as being "disposed on" another element, the elements are understood to be in at least partial contact with each other, unless otherwise specified.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 1:
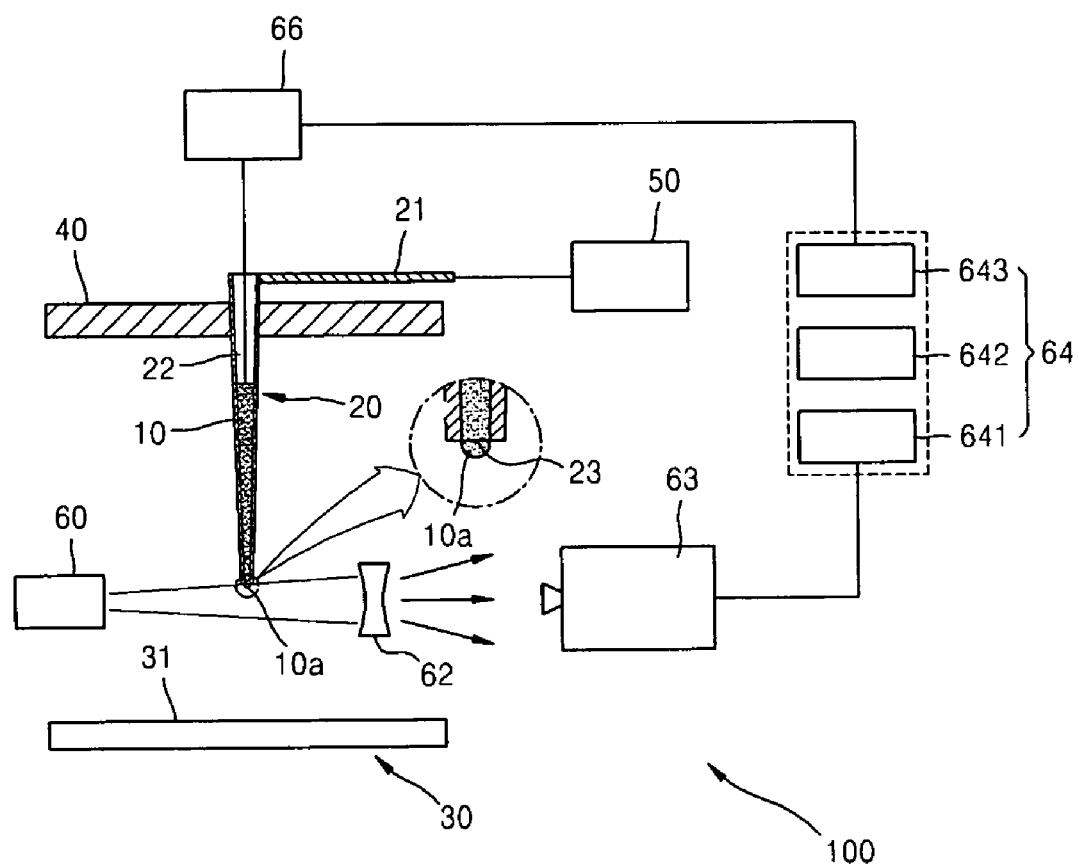
FIG. 1 is a schematic and partial cross-sectional view of a device for printing droplets onto a substrate using an electric charge concentration effect according to an exemplary embodiment of the present invention.
Figure 2A:
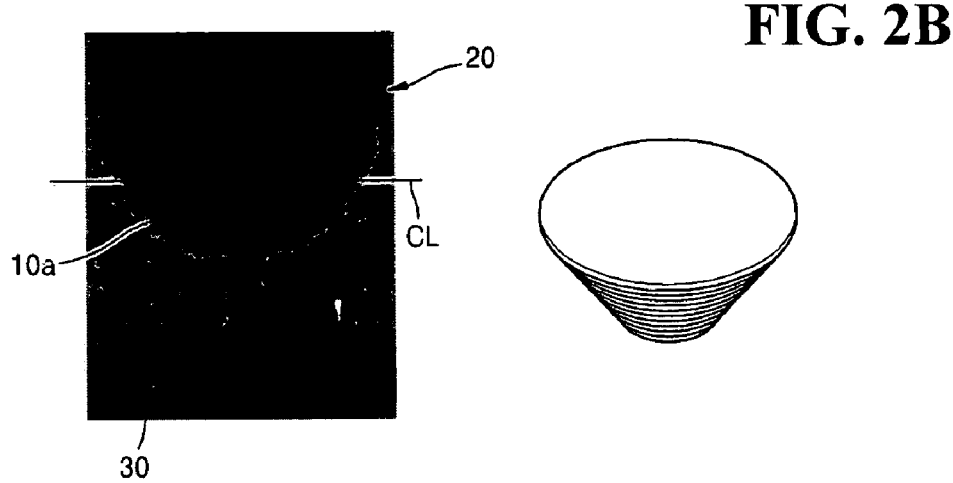
FIG. 2A is a two-dimensional image of a droplet sensed by an image sensor.
Figure 2B:
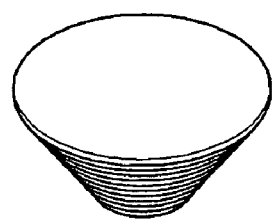
FIG. 2B is a perspective three dimensional image of the droplet of FIG. 2A illustrating the concept of integrating circular cross-sectional areas of the droplet.
Figure 3A:
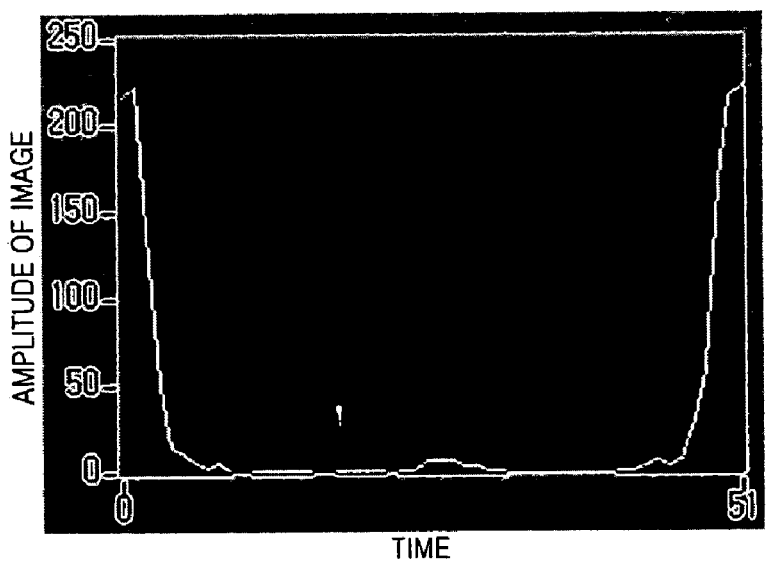
FIGS. 3A through 3C are graphs illustrating the principles of measuring the volume of the droplet from the two-dimensional image during the process of dropping the droplet onto the substrate using the printing device of FIG. 1.
Figure 3B:
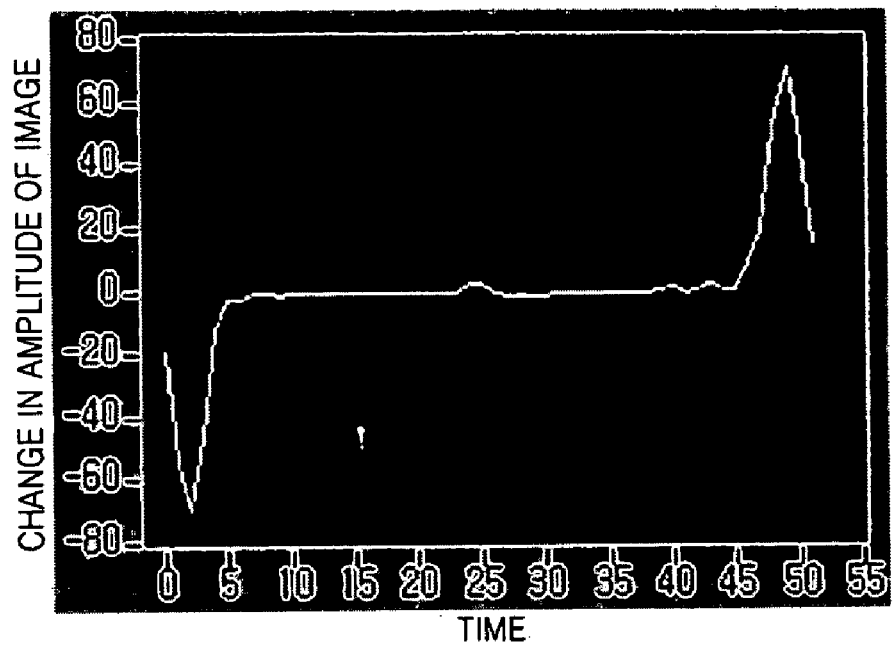
Figure 3C:
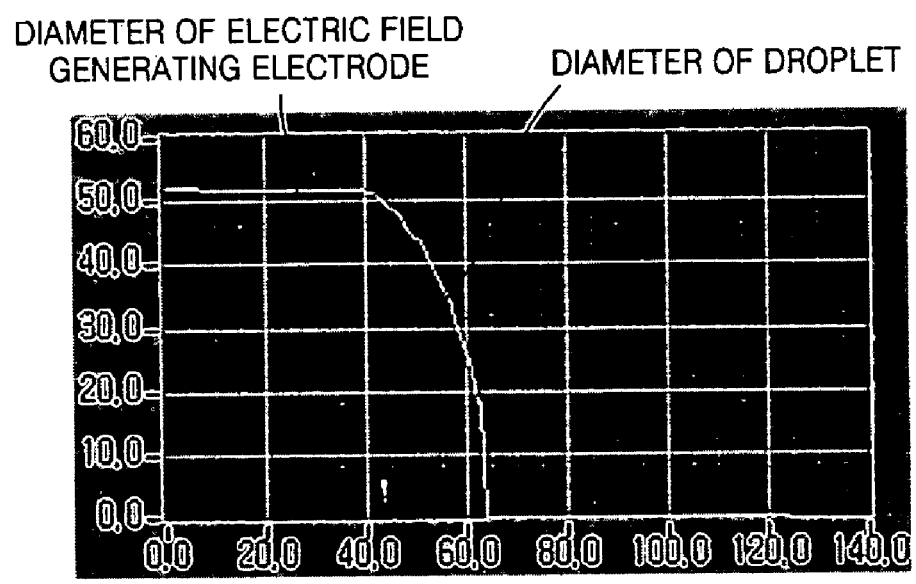
Figure 4:
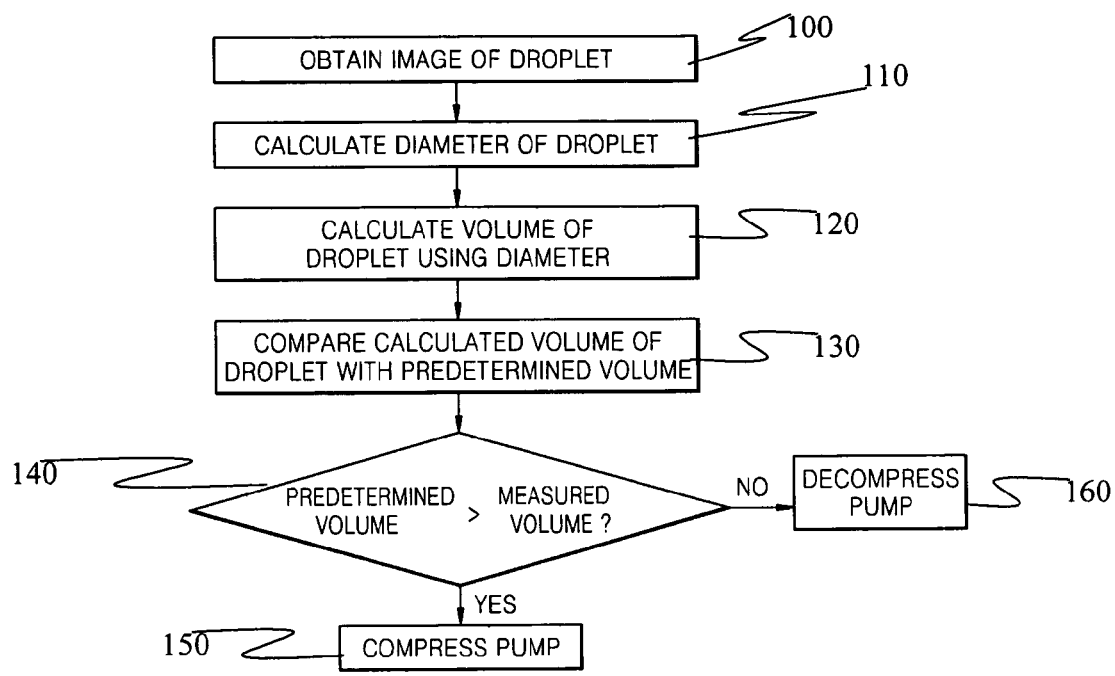
FIG. 4 is a flow chart illustrating an algorithm for calculating the volume of the droplet and controlling the volume of the droplet based on the calculated volume performed by a computer processor in the printing device of FIG. 1.
Figure 5:
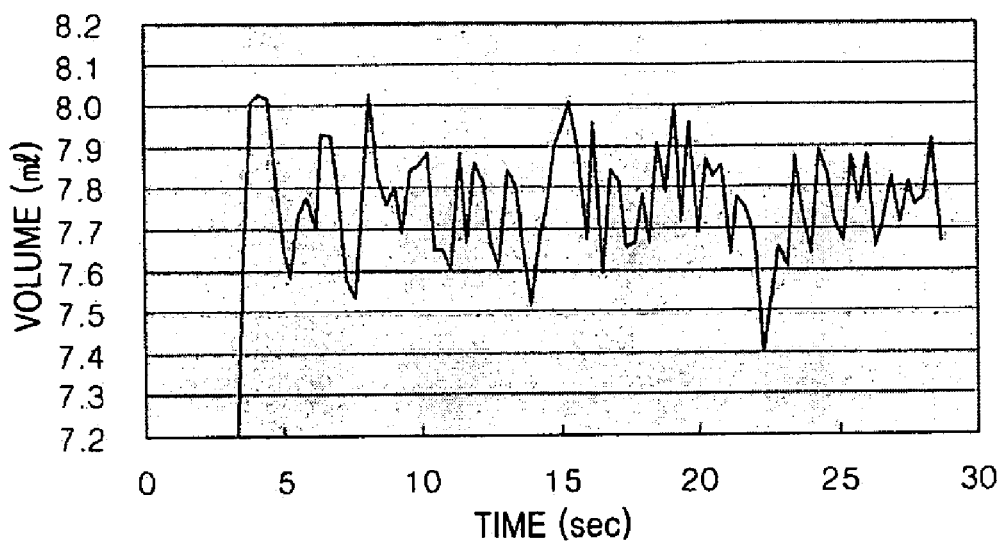
FIGS. 5 through 7 are graphs illustrating the volume of the droplet formed on the discharge hole with volume settings of 8 nl, 10 nl and 12 nl, respectively.
Figure 6:
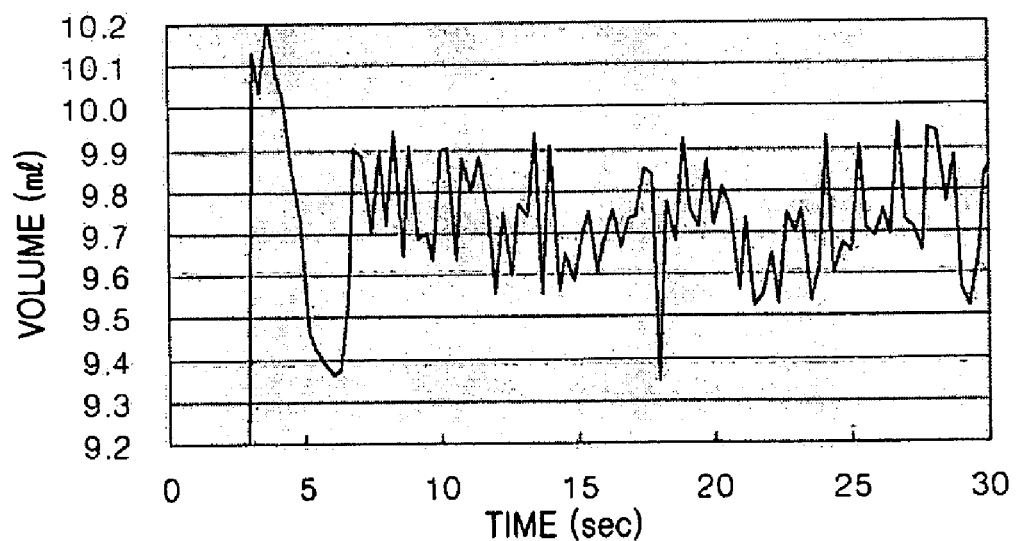
Figure 7:
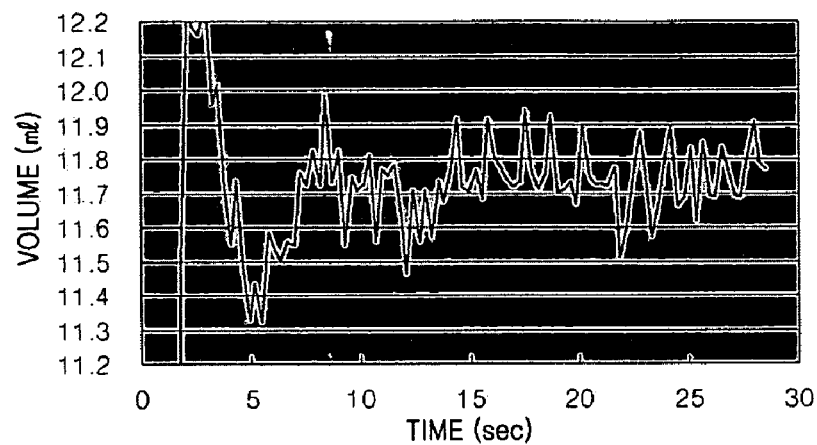
Figure 8:
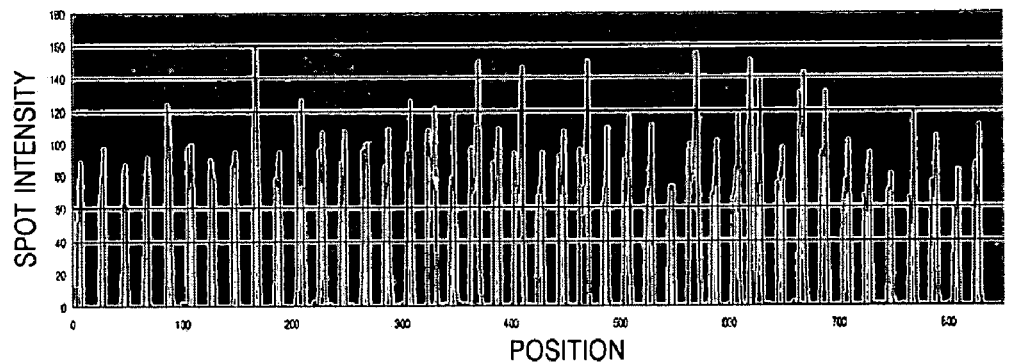
FIG. 8 is a graph of intensities of printed spots after printing the droplet onto the substrate using the printing device of FIG. 1.
Figure 9:
FIG. 9 is a photograph obtained by scanning the printed spots after printing the droplet onto the substrate using the printing device of FIG. 1.

FIG. 1 is a cross-sectional view of a device 100 for printing droplets 10a onto a substrate 30 using an electric charge concentration effect according to an exemplary embodiment of the present invention. FIG. 2A is a two-dimensional image of the droplet 10a sensed by an image sensor and FIG. 2B illustrates an example of the concept of integrating circular cross-sectional areas of the droplet 10a. FIGS. 3A through 3C are graphs illustrating the principles of measuring the volume of the droplet 10a from the two-dimensional image during the process of dropping the droplet 10a onto the substrate 30 using the device 100. FIG. 4 is a flow chart illustrating an algorithm for calculating the volume of the droplet 10a and controlling the volume of the droplet 10a based on the calculated volume performed by a computer processor 64 in the device 100. In addition, FIGS. 5 through 7 are graphs illustrating the volume of the droplet 10a formed in a discharge hole with volume settings of 8 nl, 10 nl and 12 nl, respectively. FIG. 8 is a graph of the intensities of printed spots after printing the droplet 10a onto the substrate 30 using the device 100. FIG. 9 is a photograph obtained by scanning the printed spots after printing the droplet 10a onto the substrate 30 using the printing device 100.

Referring to FIGS. 1 through 9, the device 100 for printing a droplet 10a on the substrate 30 using an electric charge concentration effect includes: an electric field generating electrode 20, a substrate 30, a printer body 40, an open type voltage applier 50, a volume measuring unit and a droplet controlling unit.

The electric field generating electrode 20 can be formed of a conductive metal such as gold, platinum, or copper; a conductive polymer; indium-tin-oxide ("ITO") glass; carbon nanotubes; or a combination of two or more of the foregoing materials. In the present exemplary embodiment, the electric field generating electrode 20 is formed of stainless steel. The electric field generating electrode 20 is needle shaped (e.g., long narrow taper), and extends vertically, as illustrated in FIG. 1. An electrode lead wire 21 is connected to an upper end of the electric field generating electrode 20, and the electric field generating electrode 20 is connected to an open circuit type voltage applier 50 that will be described later via the electrode lead wire 21.

The electric field generating electrode 20 includes a receiving portion 22 and a discharge hole 23.

The receiving portion 22 receives a solution including bioparticles such as nucleic acids (e.g., probe DNA, RNA, PNA and LNA), proteins (e.g., antigen and antibody), oligopeptides, eukaryotic cells (e.g., human cells, animal cells and vegetable cells), viruses, bacteria and possibly ink.

The discharge hole 23 is formed on a lower end of the receiving portion 22, and is in fluid communication and connected to the receiving portion 22. The inner diameter of the discharge hole 23 is small enough to allow the surface tension of the droplet 10a to suspend the droplet 10a from the discharge hole 23. The droplet 10a received via the receiving portion 22 can be discharged from the receiving portion 22 through the discharge hole 23 by an electric charge concentration effect. The periphery of the discharge hole 23 is hydrophobic, and thus, the contact angle of the droplet 10a is sufficiently high to prevent the droplet 10a from flowing outward.

The substrate 30 is used to form a biochip or a DNA microarray. The substrate 30 is formed of glass or a polymer, that is, an electric insulator, or formed of two or more among silicon, glass and a polymer. In the present exemplary embodiment, the substrate 30 is formed of an amine-coated glass. An air layer should be formed below the substrate 30. A stage formed of a conductor such as a metal, should not support the substrate 30 so that an electromagnetic interaction between the region below the substrate 30 and the electric field generating electrode 20 does not occur so as not to affect the electric field formed by the open circuit type voltage applier 50. The substrate 30 is disposed under the electric field generating electrode 20, and in particular, is approximately vertical to the longitudinal direction of the electric field generating electrode 20. A target portion is formed on the substrate 30. The droplet 10a discharged from the discharge hole 23 of the electric field generating electrode 20 is dropped onto the target portion and attaches thereto on the substrate 30. The substrate 30 is not grounded. The surface of the substrate 30, the target portion in particular, is coated with at least one of an amine group, a carboxyl group, streptavidine, biotin, thiol and poly-L-Lysine. Accordingly, the droplet 10a can be firmly attached to the substrate 30. In addition, the substrate 30 is installed on an electrically non-conductive stage (not shown) and can be conveyed by a conveyer.

The printer body 40 is disposed above the discharge hole 23 of the electric field generating electrode 20, as illustrated in FIG. 1. The printer body 40 supports the electric field generating electrode 20, and is formed of polymethlymethacrylate ("PMMA"). The printer body 40 can be moved in three-dimensions along x, y, and z-axes by an independent driving device (not shown). Therefore, the driving device can move the electric field generating electrode 20 supported by the printer body 40 above the target portion and separate the electric field generating electrode 20 by a predetermined distance from the target portion of the substrate 30.

The open circuit type voltage applier 50 is electrically connected to the electric field generating electrode 20. The open circuit type voltage applier 50 can apply a voltage pulse to the electric field generating electrode 20 through the electrode wires 21 to form an electric field between the electric field generating electrode 20 and the substrate 30. When the electric field is generated between the electric field generating electrode 20 and the substrate 30, the droplet 10a is dropped from the discharge hole 23 to the substrate 30, and thus, a spot is formed on the substrate 30 by the droplet 10a. As the period of the voltage pulse is reduced, the number of spots formed per unit time is increased.

The voltage pulse may have a magnitude of about 100 V to about 100,000 V, and a pulse width of about 10 μs to about 100 ms. If the magnitude and/or pulse width of the voltage pulse is outside of the above ranges, a Coulomb force (Fe) applied to the droplet 10a is not appropriate, and thus, the droplet 10a is not dropped onto the substrate 30 efficiently. The voltage pulse may be trapezoidal. When the voltage pulse is trapezoidal, the periods when the electric field is generated and is not generated between the electric field generating electrode 20 and the substrate 30 can be clearly distinguished, and thus, the spots can be efficiently formed by dropping the droplet 10*a* from the discharge hole 23 onto the substrate 30.

A volume measuring unit includes a light source 60, an image sensor 63 and the computer processor 64.

The light source 60 radiates light onto the droplet 10*a* protruding from the discharge hole 23. The light from the light source 60 forms a shaded image when interacting with the droplet 10*a*. The light source 60 is disposed so as to radiate the beam perpendicularly to the longitudinal direction of the electric field generating electrode 20. A general fluorescent light bulb or a light emitting diode ("LED") can be used as the light source 60.

The image sensor 63 detects the shaded image produced when the light from the light source 60 interacts with the droplet 10*a*. The image sensor 63 is a semiconductor device for converting an optical signal into an electric signal, for example, a charge coupled device ("CCD"). In the CCD image sensor 63, a plurality of metal-oxide-silicon ("MOS") capacitors are disposed close to each other. Electric charges are stored in the MOS capacitors, and the stored charges are conveyed. The image sensor 63, such as a CCD, is well known in the art, and thus a detailed description of the image sensor 63 will be omitted.

The image sensor 63 can sense the shaded image of the droplet 10*a* in one-dimension or two-dimensions. That is, since the droplet 10*a* is generally a portion of a sphere, the length of the droplet 10*a* is proportional to the volume of the droplet 10*a*, and thus, when the length of the droplet 10*a* is detected, the volume of the droplet 10*a* can be calculated. A one-dimensional image sensor can be used to calculate the length of the droplet. When a two-dimensional image sensor is used, the diameter of the shade image of the droplet 10*a* is measured at intervals along the length of the shaded image to calculate the areas of circular cross-sections, and then, the area of the circular cross-section is integrated along the length of the droplet to calculate the volume of the droplet 10*a*. In the present exemplary embodiment, a two-dimensional image sensor is used as the image sensor 63. A diverging lens 62 is disposed between the image sensor 63 and the light source 60 to magnify the shaded image of the droplet 10*a*. The diverging lens 62 diverges the shaded image of the droplet 10*a* to improve a sensing yield of the image sensor 63 since the droplet 10*a* is small. The diverging lens 62 can include a concave lens that diverges incident light.

The computer processor 64 calculates the volume of the droplet 10*a*, and generates an output signal for driving a pump 66 after comparing the calculated volume to the predetermined volume of the droplet 10*a*. The pump 66 will be described later.

The computer processor 64 includes an input unit 641, a controller 642 and an output unit 643. The input unit 641 receives data relating to the shaded image of the droplet 10*a* from the image sensor 63.

The controller 642 calculates the volume of the droplet 10*a* from the data relating to the shaded image of the droplet 10*a* input from the input unit 641, and generates the output signal for driving the pump 66. The controller 642 calculates the volume of the droplet 10*a* using an algorithm.

FIG. 2A illustrates an example of the shaded image of the droplet 10*a* and FIG. 2*b* illustrates the concept of integrating circular cross-sectional areas of the droplet 10*a*. FIG. 3A illustrates the image brightness profile along a crossing line ("CL") illustrated in FIG. 2A. The image brightness profile can distinguish the boundary of the droplet 10*a* by variations in the brightness according to position along the crossing line. In addition, referring to FIG. 3B, the image brightness profile can be differentiated with respect to time in order to distinguish the boundary of the droplet 10*a* more precisely. In detail, peaks and valleys shown in FIG. 3B indicate the boundary of the droplet 10*a*, and the distance between the peak and the valley indicates the width of a dark portion of the image. The width of the dark portion of the image represents the diameter or twice the radius (2R) of the circular cross-section of the droplet 10*a*. FIG. 3C shows the diameter 2R of the circular cross-section of the droplet 10*a* according to position calculated using the processes described with reference to FIGS. 3A and 3B. Therefore, cross-sectional areas ($\pi R^2$) of the circular cross-sections can be calculated. As described above, the crossing line (CL) is moved from the bottom of the discharge hole 23 to the bottom of the droplet 10*a* to calculate the area of the circular cross-section of the droplet 10*a*, and the cross-sectional areas are integrated along the length of the droplet 10*a* to calculate the volume of the droplet 10*a*.

Processes performed by the controller 642 using the above principles will now be described in more detail. Referring to FIG. 4, the image of the droplet 10*a* is obtained from the image sensor 63 at block 100. The image data is input into the controller 642 through the input unit 641. The controller 642 calculates the diameters of the circular cross-sections at the crossing line (CL) while moving the crossing line (CL) along the length of the droplet 10*a* in pixel units at block 110, and then calculates the areas of the circular cross-sections using the diameters. This process is repeated for all pixels, and the areas of the circular cross-sections are summed to calculate the volume of the droplet 10*a* at block 120. The measured volume of the droplet 10*a* is compared to a predetermined volume that is set in advance at block 130. If the measured volume of the droplet 10*a* is less than the predetermined volume at block 140, a signal that makes the pump 66 push the solution 10 received in the receiving portion 22 is generated at block 150, and thus, the volume of the droplet 10*a* is increased. On the other hand, if the measured volume of the droplet 10*a* is greater than the predetermined volume of the droplet 10*a* at block 140, a signal that makes the pump 66 reduce the pressure applied onto the solution 10 received in the receiving portion 22 is generated at block 160, and thus, the volume of the droplet 10*a* is reduced. The above algorithm is performed repeatedly to maintain the droplet 10*a* at the predetermined volume.

The output unit 643 outputs to the pump 66 the control signal for controlling the pump generated by the controller 642.

A solution control unit includes the pump 66. The pump 66 may be a syringe pump. The syringe pump has a variable flow rate that can supply a small amount of reagent at a constant flow rate. The syringe pump includes a micro-stepping motor having a high resolution, and the structure of the syringe pump is well known in the art, and thus a detailed description of the syringe pump will be omitted. The pump 66 receives the driving signal from the output unit 643 of the computer processor 64, and compresses or decompresses the solution 10 in the receiving portion 22 to increase or decrease the volume of the droplet 10*a* that protrudes from the discharge hole 23.

Hereinafter, processes of printing the solution 10 using the device 100 for printing droplets 10*a* including bioparticles onto the substrate 30 using the electric charge concentration effect will be described in detail.

First, the driving device moves the printer body 40 supporting the electric field generating electrode 20 above the target portion of the substrate 30. Then, the solution 10 including bioparticles such as nucleic acids (e.g., probe DNA, RNA, PNA and LNA), proteins (e.g., antigens and antibodies), oligopeptides, eukaryotic cells (e.g., human cells, animal cells and vegetable cells), viruses and bacteria is supplied to the receiving portion 22 of the electric field generating electrode 20.

Figure 10:
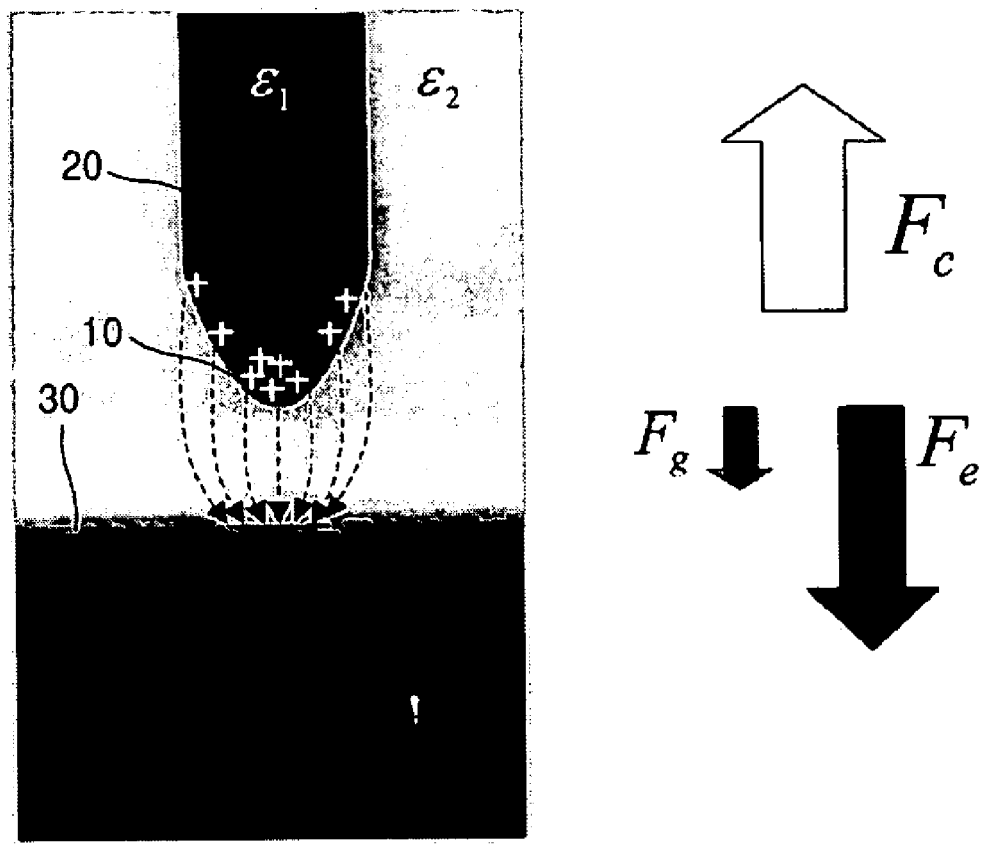
FIG. 10 is a schematic view illustrating the distribution of positive charges in the droplet and negative charges induced in the substrate when a voltage is applied to the printing device of FIG. 1, and the relationship between the forces applied to the droplet.

After supplying the solution 10, the open circuit type voltage applier 50 applies the voltage pulse ranging from about 100 V to about 100,000 V with a pulse width ranging from about 10 µm to about 100 ms to the electric field generating electrode 20 so that positive charges collect in the droplet 10a hanging from the discharge hole 23, and accordingly, negative charges are induced into the substrate 30. As shown in FIG. 10, an electric field is formed between the positive charges and the negative charges.

In detail, when the positive charges collect in the droplet 10a and the negative charges are induced in the substrate 30 below the droplet 10a, a Coulomb force (Fe) is generated between the positive charges and the negative charges. Since the negative charges are induced into the lower portion of the droplet 10a, the Coulomb force is concentrated at the lower portion of the droplet 10a. In addition, the droplet 10a hanging from the discharge hole 23 is dropped onto the substrate 30 like a conical shape, and forms a spot, and the positive charges in the droplet 10a cancel the negative charges in the substrate 30. Accordingly, the Coulomb force is reduced. That is, the Coulomb force that pulls the droplet 10a from the discharge hole 23 is reduced because the Coulomb force is reduced by cancelling positive and negative charges together.

During the above processes, the volume of the droplet 10a protruding from the bottom of the discharge hole 23 is reduced gradually due to evaporation, even when the above processes are performed for a short time. However, the volume measuring unit and the solution control unit can maintain the droplet 10a protruding from the discharge hole 23 at the predetermined volume.

In a test to confirm that the volume of the droplet 10a can be maintained constant according to the present exemplary embodiment, the volume of the droplet 10a was set at 8 nl. Then, a DNA solution having a sequence of $NH_2$-$C_6$-tgttctct-tgtcttg 3' was printed onto an amine-coated substrate using the device 100 for printing the solution using the electric charge concentration effect. When the spot obtained through the above experiment was hybrized with DNA having a target sequence of $Cy_3$-$C_6$-caagacaagagaaca 3', the spot pattern shown in FIG. 9 was obtained. The photograph shown in FIG. 9 was obtained using an Axon scanner, and the spot intensity of the spot pattern is shown in FIG. 8.

In addition, when the volume measuring unit and the solution control unit were operated, the volume of the droplet 10a was found to be as shown in FIGS. 5 through 7. FIG. 5 illustrates the volume when the volume of the droplet 10a was set at 8 nl, FIG. 6 illustrates the volume when the volume of the droplet 10a was set at 10 nl, and FIG. 7 illustrates the volume when the volume of the droplet 10a was set at 12 nl. As shown in FIGS. 5 through 7, the volume of the droplets can be maintained at a predetermined value with an error range ±0.14 nl.

Figure 11:
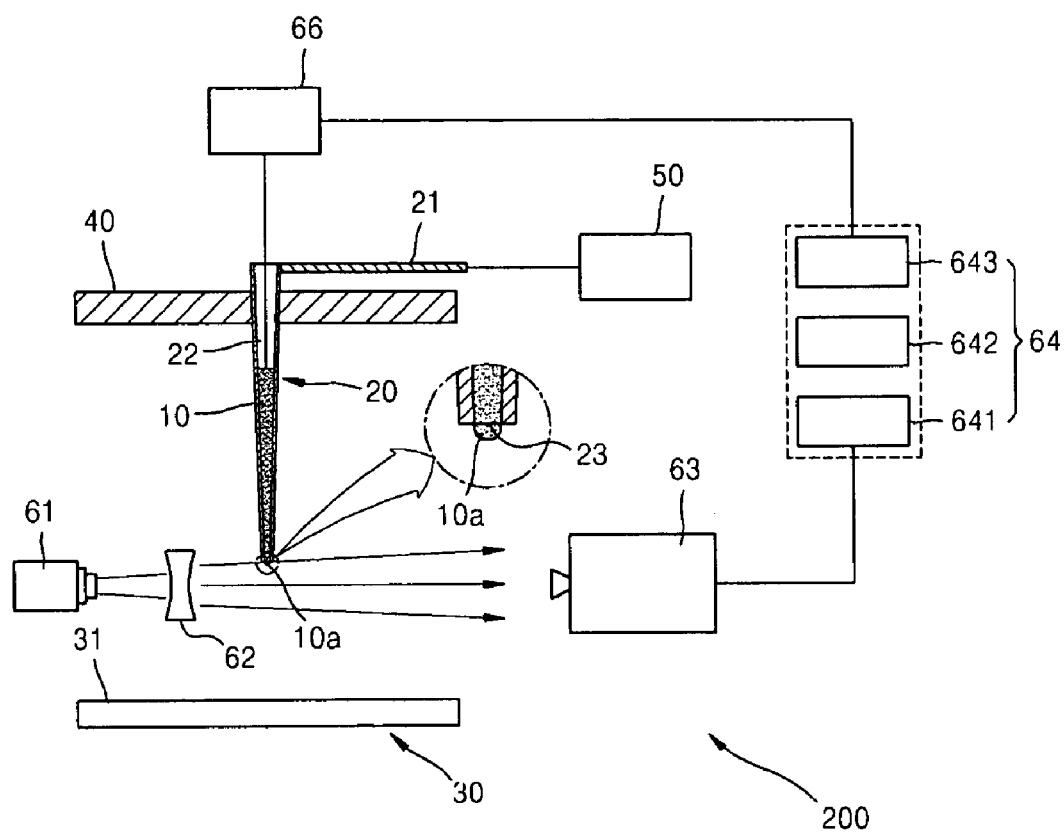
FIG. 11 is a schematic and partial cross-sectional view of a device for printing a droplet using an electric charge concentration effect according to another exemplary embodiment of the present invention.

FIG. 11 illustrates a device 200 for printing a droplet 10a on a substrate 30 using an electric charge concentration effect according to another exemplary embodiment of the present invention. The device 200 for printing the droplet 10a on the substrate 30 uses a laser beam source as a light source 61. In order to form a shaded image of the droplet 10a using the laser beam, a divergent lens 62 is disposed between the laser source 61 and the droplet 10a to disperse the light radiated onto the droplet 10a.

Figure 12:
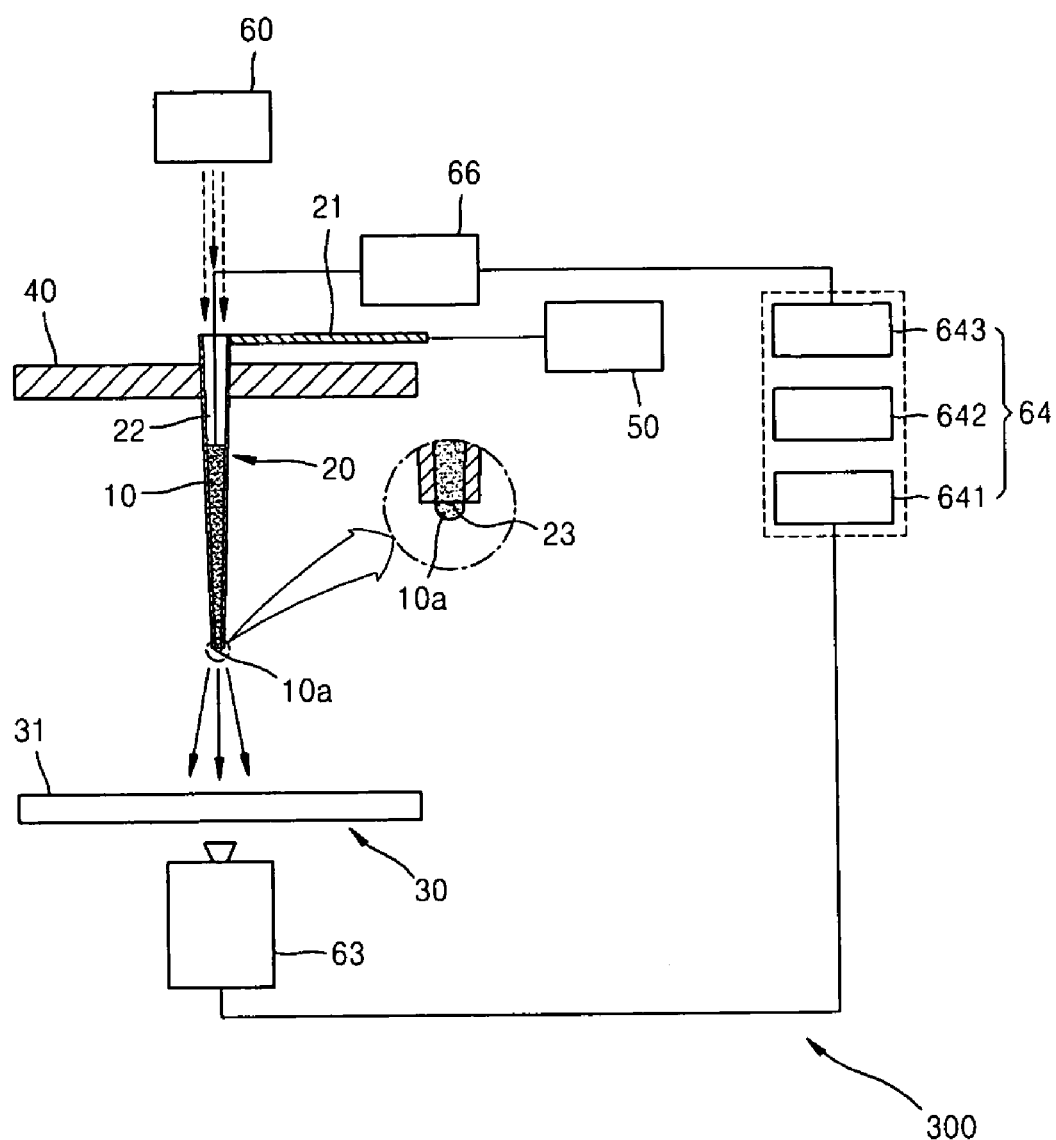
FIG. 12 is a schematic cross-sectional view of a device for printing a droplet using an electric charge concentration effect according to yet another exemplary embodiment of the present invention.

FIG. 12 illustrates a device 300 for printing a droplet 10a on a substrate 30 using an electric charge concentration effect according to yet another exemplary embodiment of the present invention. The device 300 for printing the droplet 10a on the substrate 30 includes a light source 60 disposed above a receiving portion 22 so that the droplet 10a can act as a divergent lens. The substrate 30 is formed of a transparent material, and the image sensor 63 is disposed under the substrate 30. Other elements of the device 300 are the same as those of the previous exemplary embodiments of FIGS. 1 and 11, and thus, a detailed description of the elements will be omitted.

In the above exemplary embodiments of the present invention, a device for printing the solution including the bioparticles onto the substrate 30 is described, but a device according to an exemplary embodiment of the present invention can print ink onto paper or a substrate using the electric charge concentration effect, and is similar to the device for printing the solution including the bioparticles on the substrate 30. In addition, a color filter for a display can be manufactured by dropping ink onto a glass substrate using the electric charge concentration effect.

Exemplary embodiments of the present invention are described above, but the present invention is not limited to the above exemplary embodiments and can be modified by those who skilled in the art.

For example, the device of the above-described exemplary embodiments prints the droplet onto the substrate using the electric charge concentration effect, but the present invention can be applied to a device for printing the droplet onto the substrate without using the electric charge concentration effect.

In addition, the device of the above-described exemplary embodiments includes the printer body 40, but the printer body 40 is not essential.

Although the pulse type voltage is applied to the electric field generating electrode 20 in the above-described exemplary embodiments, the aspect of the present invention can be obtained in cases of no pulse type voltage.

In the above-described exemplary embodiments of the present invention, the voltage pulse ranging from about 100 V to about 100,000 V is applied to the electric field generating electrode 20. However, the aspect of the present invention can be obtained even when the voltage pulse exceeds the above range, but the efficiency is reduced.

The pulse width of the voltage pulse ranges about 10 µs to about 100 ms in the above-described exemplary embodiments of the present invention, but the aspect of the present invention can be obtained even when the pulse width of the voltage pulse exceeds the above range.

In addition, the voltage pulse is trapezoidal in the above-described exemplary embodiments, but the voltage pulse can have various shapes, for example, a sine wave.

In addition, according to the above-described exemplary embodiments, positive charges are formed in the solution and negative charges are induced in the substrate, but negative charges can be formed in the solution and positive charges can be induced in the surface of the substrate facing the solution. In both cases, the Coulomb force is generated between the positive charges and the negative charges, and thus, the droplet can be dropped onto the substrate 30.

In addition, the light source is disposed perpendicularly to the longitudinal direction of the electric field generating electrode in FIG. 1 and FIG. 11, but the light source can be disposed at various other positions as illustrated in FIG. 12 (e.g., axially aligned to the longitudinal direction of the electric field generating electrode in FIG. 1 and FIG. 11).

Also, a syringe pump is given as an example of the pump in the above-described exemplary embodiments of the present invention, but any pump that can increase or decrease the pressure applied to the solution in the receiving portion can be used.

In the above-described exemplary embodiments of the present invention, the substrate formed of a non-conductor is not grounded, and the bottom of the substrate is disposed on an air layer so as not to affect the electric field formed by the open circuit type voltage applier. However, the substrate may be grounded, and can be formed of a conductor. In addition, the substrate may not be disposed on an air layer if the bottom of the substrate has a structure that does not affect the electric field formed by the open circuit type voltage applier.

According to the present invention, the uniformly sized spots can be formed on the substrate by maintaining the droplet including the bioparticles or the ink at a predetermined volume. Therefore, the spots can be formed precisely. In addition, high-density biochips having spots of uniform size can be manufactured by dropping the solution in the receiving portion onto the substrate in droplets of uniform volume.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A device for printing a droplet onto a substrate, the device comprising:
    a droplet generating member which is needle-shaped and comprises:
        a receiving portion disposed vertically to receive a solution; and
        a discharge hole connected to the receiving portion and formed on the bottom of the receiving portion so that the solution can be discharged from the receiving portion;
    a substrate disposed below the droplet generating member, the substrate includes a target portion to which the droplet discharged from the discharge hole of the droplet generating member is dropped and attached;
    a voltage applier which applies a voltage to the droplet so that the droplet can be dropped onto the target portion of the substrate;
    a volume measuring unit which measures the volume of the droplet while it hangs from the droplet generating member; and
    a droplet control unit which maintains the volume of the droplet at a predetermined level based on the measured volume of the droplet,
    wherein the droplet control unit increases or decreases compression in the solution in the receiving portion according to a signal from the volume measuring unit.

2. The device of claim 1, wherein the volume measuring unit comprises:
    a light source emitting light onto the droplet;
    an image sensor sensing an image of the droplet that is generated by the light emitted from the light source; and
    a computer processor receiving data sensed by the image sensor and calculating the volume of the droplet.

3. The device of claim 2, further comprising a divergent lens disposed between the light source and the image sensor.

4. The device of claim 3, wherein the image sensor senses a one-dimensional image of the droplet or a two-dimensional image of the droplet.

5. The device of claim 2, wherein the light source is a laser light source, further comprising a divergent lens that is disposed between the laser light source and the droplet, the divergent lens diverges the laser beam radiated from the laser light source.

6. The device of claim 2, wherein the light source is disposed perpendicularly to a longitudinal direction defining the droplet generating member.

7. The device of claim 1, wherein the light source is disposed above the receiving portion, and the image sensor is disposed below the substrate.

8. The device of claim 1, wherein the droplet control unit includes a pump for compressing or decompressing the solution in the receiving portion.

9. The device of claim 8, wherein the pump is a syringe pump.

* * * * *